Jan. 17, 1956

H. W. BALLARD 2,730,762

APPARATUS FOR THE CONTINUOUS FABRICATION
OF REINFORCED TUBING

Filed April 21, 1953

Jan. 17, 1956 H. W. BALLARD 2,730,762
APPARATUS FOR THE CONTINUOUS FABRICATION
OF REINFORCED TUBING
Filed April 21, 1953 4 Sheets-Sheet 4
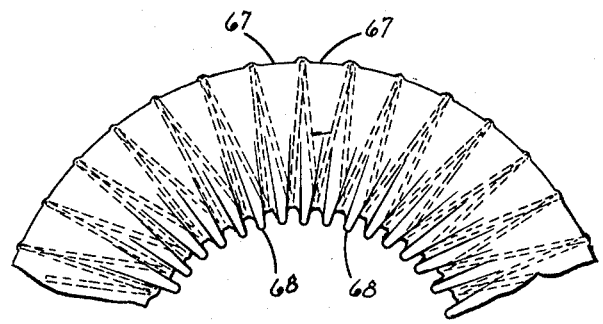
Fig. 5
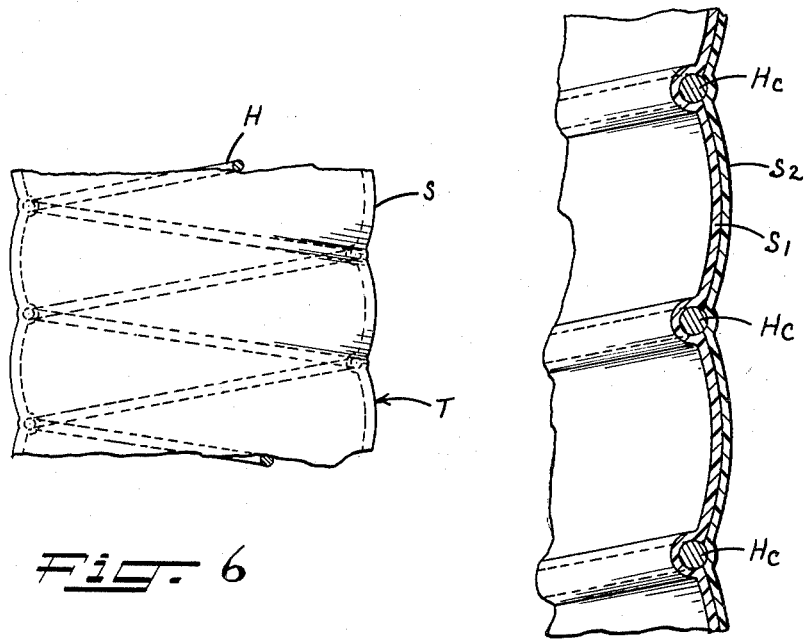
Fig. 6
Fig. 7

United States Patent Office 2,730,762
Patented Jan. 17, 1956

2,730,762

APPARATUS FOR THE CONTINUOUS FABRICATION OF REINFORCED TUBING

Hyde W. Ballard, West Chester, Pa., assignor to American Viscose Corporation, Philadelphia, Pa., a corporation of Delaware Application April 21, 1953, Serial No. 350,056

19 Claims. (Cl. 18—13)

This invention relates to machines for extruding synthetic plastic material, and more particularly to a machine for continuously fabricating reinforced flexible tubing.

A reinforced flexible tubing of the type disclosed in Meissner Patent 2,609,002 has been found to offer especial advantages for conveying fluid in air-conditioning systems and the like, because when the tubing is bent even at relatively sharp radii, there is no reduction in cross-sectional area at the bend which would be objectionable because of restricting fluid flow. This freedom from restriction is provided because the synthetic sheath or casing for the tubing bows or bulges outwardly between the convolutions of the reinforcing element. This construction inherently forms folds or ridges which are always outside the reinforcing member when the tubing is bent.

No satisfactory means, however, has heretofore been provided for fabricating such a product continuously because the sheathing material is heat and/or pressure sealed to enclose the reinforcing helix. Pressure sealing requires reinforcement from the inside of the tubing and the conventional mandrel on which such tubing is ordinarily formed would obviously produce a product having a smooth cylindrical bore in which a substantial proportion of the sheathing material would be disposed radially inward of the mean diameter of the helix of reinforced material. Such construction does not prevent inward bulging of the sheathing material when the tubing is bent whereby the axial distance between the convolutions is reduced. When substantially all of the sheath is well outside the mean diameter of the reinforcing helix, in an unstressed condition, the sheath cannot possibly buckle or fold inwardly when the turns of the reinforcement are compressed axially.

The primary object of the present invention, therefore, is to provide apparatus for continuously producing a reinforced flexible tubing having a sheath of pressure-sealable synthetic plastic material in which the sheath when in a straight, unstressed condition is of substantially greater diameter than the mean diameter of the helical reinforcing.

A further object of the invention is to provide apparatus for extruding continuously a sheath of synthetic plastic material around a continuously-formed helix whereby the helix is covered by the sheath to form a helical land around the bore of the tubing.

A further object of the invention is to provide apparatus for continuously producing flexible tubing having a metallic helical reinforcement and a sheath comprising two sleeves or layers of pressure-sealable synthetic plastic material, the inner layer of which substantially surrounds the helical reinforcement and the outer layer of which is pressure-sealed to the inner layer and to a relatively small area of the reinforcement.

A further object of the invention is to provide in apparatus for continuously fabricating reinforced flexible tubing, a roller mandrel in the bore of the tubing after the sheath is extruded which cooperates with an external rotating and revolving roller mandrel to pressure seal the extruded sheath around the helical reinforcement in accordance with the contour of both mandrels.

A still further object of the invention is to provide in a machine for producing continuously flexible reinforced tubing, means for retaining and simultaneously feeding the helical reinforcement axially without back-winding.

A still further object of the invention is to provide an improved winding head for supplying synthetic plastic material to the inside and outside of an axially fed reinforcing helix.

Further objects will be apparent from the specification and drawings in which:

Figure 5 shows the characteristic feature of flexible tubing produced in accordance with the present invention when the tubing is bent;

Figure 6 is an enlarged view of the tubing when in a normal, straight, unstressed condition; and Figure 7 is an enlarged sectional detail showing the relative disposition of the sheath and the reinforcing which enables the desirable folding of Figure 5 to be achieved.

Figure 1:
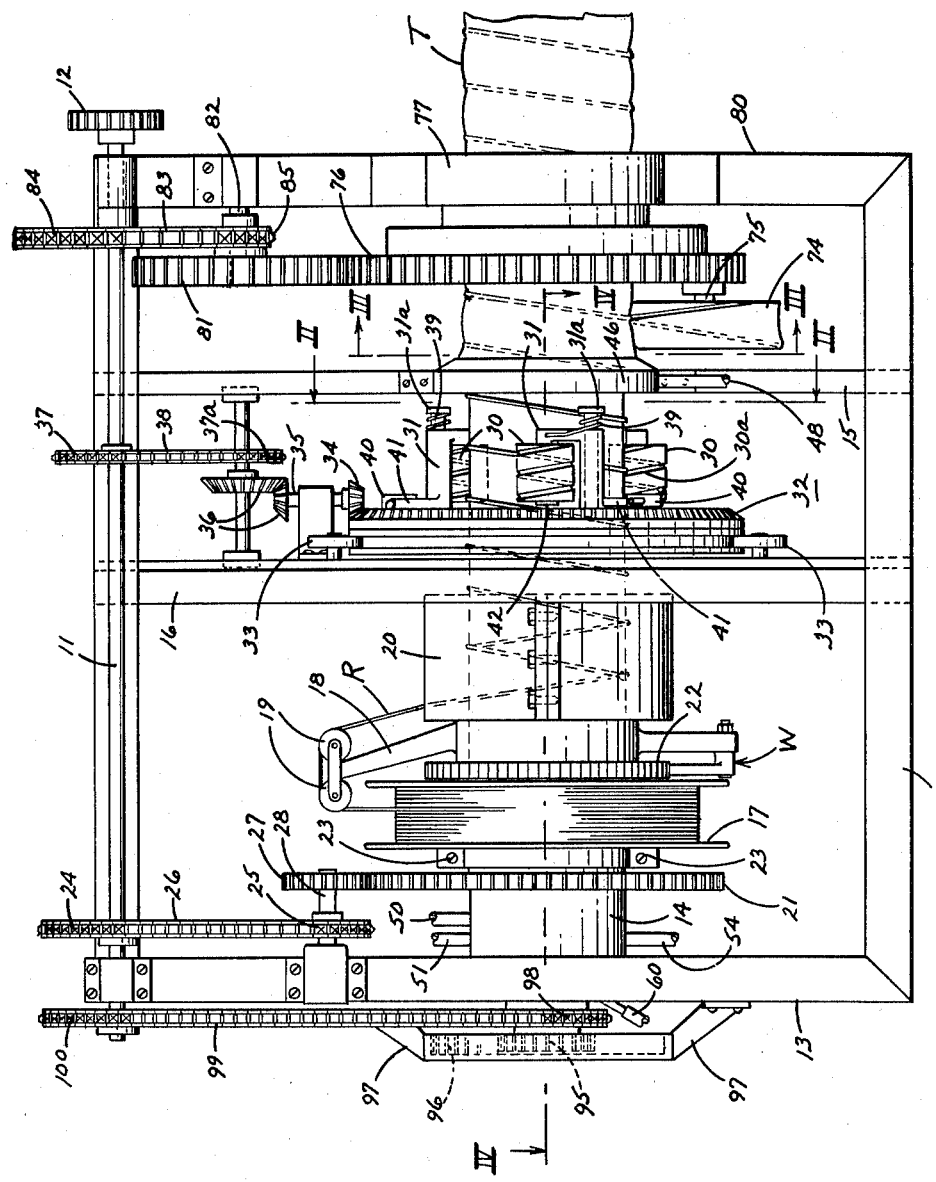
Figure 1 is a top view of a flexible tube fabricating machine constructed in accordance with the present invention.

The invention comprises essentially the provision of a wire winding head which continuously produces a helical reinforcement wire or other flexible strandlike material around a stationary mandrel together with means for pressing the helix of reinforcing material against the mandrel to prevent back-turning. The helix is simultaneously fed or moved axially to or through an extruding head which is located adjacent the terminus of the fixed mandrel. The extruding head comprises an inner annular nozzle through which a sleeve of liquid thermoplastic material is forced under suitable conditions of heat and pressure. A cooperating external extruding member comprises an annular orifice surrounding the mandrel and the helix through which a larger diameter sleeve of heat and pressure sealable synthetic plastic material is extruded. The helical reinforcing element is fed between or into the inner and outer sleeves whereupon the tubing may be cooled and the sleeves pressure sealed together by means of a pair of rollers, one of which is on the inside of the inner sheath and the other on the outside. These pressure sealing mandrels or rollers both rotate on their own axes, and revolve together about the center of the tubing so that the nip between the rollers progresses around the tubing as it is fed axially through the apparatus. A helical groove on each sealing roller assists in axial feeding of the tube, and the shape of the peripheries of the rollers can be formed to provide the desired configuration and positioning of the pressure sealed sheath with respect to the reinforcing helix.

Referring more particularly to the drawings, the continuous tube fabricating machine constructed in accordance with a preferred embodiment of the present invention comprises a framework 10 on which is journaled a drive shaft 11 connected to any convenient source of power (not shown) by means of a sprocket or pulley 12. Cross member 13 of the frame rigidly supports a stationary cylindrical mandrel 14 which extends from cross member 13 to a point approximately in line with cross-frame member 15. A conventional wire winding device designated by the letter W wraps turns of the reinforcing strand or wire R around the mandrel 14 at a point in advance of cross member 16. The winder W may take one of several well known forms such as, for example, the winder shown in Chernack Patent 2,343,747. A supply drum 17 delivers the strand R to a guide arm or flyer 18 having one or more guide rollers 19, 19 over which the wire or strand passes. From thence the strand R is fed through a split nut 20 which is driven through a suitable sleeve (not shown) connected to gear 21. A pawl and ratchet assembly 22 provides the suitable differential rotation between the flyer 18 and the spool or drum 17. In the form herein illustrated the spool 17 is split and secured around the mandrel by clamping ears and bolts shown at 23, 23. Drive for the split nut 20 and gear 21 is provided from the main drive shaft 11 through sprockets 24, 25, chain 26 and pinion gear 27 on countershaft 28. It will be understood that the reinforcing strand R may be metallic or non-metallic. Non-metallic forms would be preferably a mono-filament of synthetic plastic material having the desired resiliency. For the purposes of this disclosure, however, the term "wire" used hereinafter is intended to include both metallic and non-metallic material.

Figure 2:
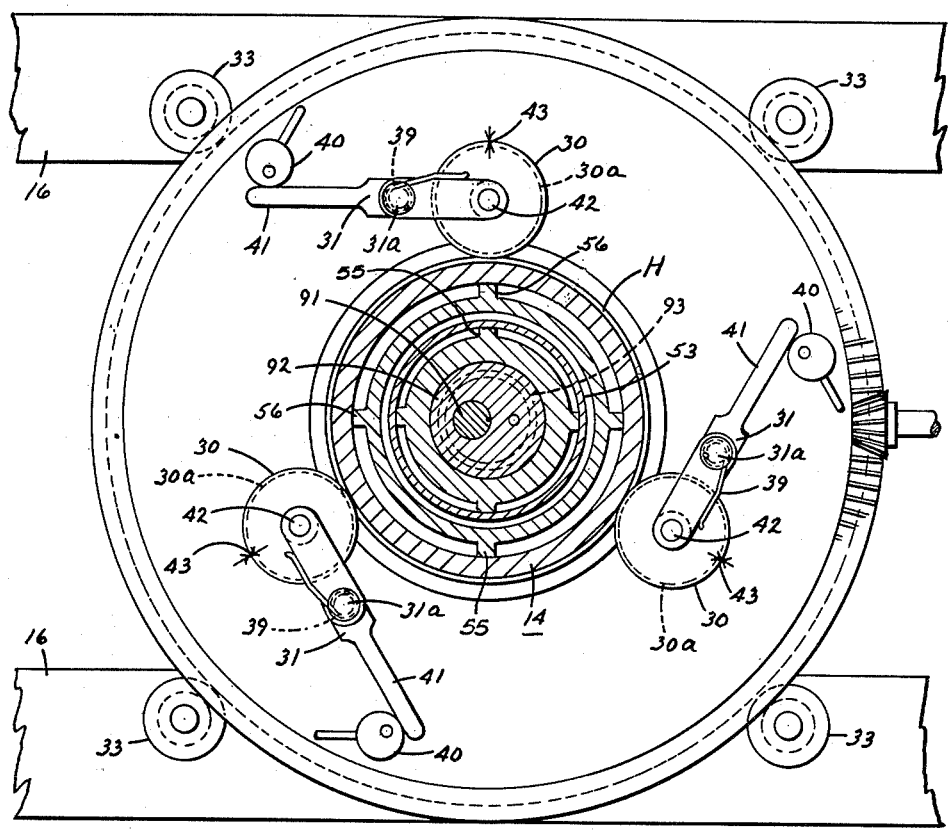
Figure 2 is an enlarged transverse section as seen at II—II of Figure 1.

A primary problem in winding a helix of wire or other similar material is to clamp or retain the end of the strand so that the turns do not "back up." In a continuous machine, it is obvious that this clamping problem must be solved in such a way that the leading end of the wire is free to be removed or otherwise processed after the helix is completely discharged from the winding head. Unless this can be done, the length of the helix is, of course, limited by the length of the mandrel or other stationary structure on which the helix is wound. In order to permit the continuous production and extrusion of the present helically wound product so that it may be fabricated without interruption provided the supply of reinforcing wire R and the sheath material is not exhausted, I press the turns of wire against the mandrel 14 by means of a plurality of specially designed rollers 30, 30 (Figures 1 and 2). These rollers are journaled in brackets or yokes 31, 31 which are pivotally mounted on a plate or wheel 32 rotatable in guide rollers 33, 33 on cross member 16. Plate 32 is turned in timed relation to the speed of winding head W by means of suitable bevel gearing 34, countershaft 35, gearing 36, driven from main shaft 11 through sprockets 37, 37a and chain 38. The rollers 30, 30 are spring-loaded to compress and retain the turns of wire R against the mandrel 14 by means of individual fly springs 39, 39. To assist lacing up the machine, the rollers may be retained in a retracted position by turning the manually operated cams 40, 40 which bear against extensions 41, 41 on the brackets 31, thus pivoting the brackets on studs 31a, 31a. The periphery of each roller 30 is provided with a helical groove 30a of a pitch corresponding to the speed with which the winding head W turns and the rate of feed of wire through nut 20.

In lacing up the winding head, it will be important to ascertain that the rollers 30 securely clamp and control the helical reinforcing wire. Initially the rollers 30 must, therefore, be turned on their individual shafts 42, 42 until the helical grooves 30a, 30a in each roller are properly timed with the wire helix. For this purpose it is convenient to use indexing marks 43, 43 so that when the marks 43, 43 on each roller are properly set with respect to the marks on the plate 32, the grooves in the peripheries of the rollers are properly timed to engage and clamp the helix H around the periphery of mandrel 14. If desired, grooves 30a, 30a may be serrated or roughened to avoid the possibility of back-turning of the helix, and the depth of the grooves will be somewhat less than the diameter of wire R to insure that the faces of the rollers 30 do not themselves contact the periphery of mandrel 14. Naturally, it will be understood that the pitch of grooves 30a, 30a, the pressure with which the rollers are forced against the helix H, the diameter of the rollers, and the number of these rollers all depend on the type of product being fabricated. In the present tube fabricating machine, rollers 30, 30 perform several important functions. In the first place, the roller assembly, which includes the plate 32 and its associated drive, prevents back-winding or back-turning of the wound helix on the mandrel 14. Second, the rollers and plate assembly when properly grooved provide the necessary axial feed for the helix H along the stationary mandrel 14; and third when a plurality of rollers are used, as shown in Figure 2, these rollers provide adequate support for the mandrel to compensate for the pressure sealing rollers to be described hereinafter.

As the helix H leaves the control of the roller assembly, it is delivered to an annular passage 45 formed between the external plastic extruding collar 46 and the terminus of mandrel 14. A synthetic plastic material, such as polyethylene, neoprene, and the thermoplastic resins of the vinyl base type sold, for example, to the trade as Vinylite, is delivered to the internal passage 47 of collar 46 through a conduit 48. The synthetic plastic for the inner sleevelike sheath $S_1$ is fed under pressure through an annular passage 49 in mandrel 14 which communicates with the plastic feed conduit 50. Passage 49 flares outwardly near the terminus of mandrel 14 and the plastic material extruded from passages 47 and 49 through their respective annular restricted orifices 47a and 49a converge substantially in registry with the annular passage 45 for helix H. The helix is delivered between the plastic sheath $S_1$ extruded from orifice 49a and the outer plastic sheath $S_2$ extruded from orifice 47a. The outer sheath of plastic supplied through conduit 48 may be conveniently heated by any suitable means not shown without difficulty. However, in order to provide adequate heat for the plastic material in passage 49, I introduce a heating medium through conduit 51 which communicates with an annular passage 52 in mandrel 14. A shield 53 in the heating passage directs incoming heating medium downwardly to the bottom of passage 52 from whence it travels around shield 53 and out passage 54. Suitable lugs or reinforcing abutments 55 and 56 are provided in the mandrel to maintain proper alignment of the various internal walls of the mandrel and also to assist in transmitting radial loads to the rollers 30, 30. Just prior to the pressure sealing operation, there may be introduced, if desired, a cooling medium, such as a blast of air, directed against the inner walls of the sheath $S_1$. Such a coolant may be introduced through conduit 60 which communicates with the annular hollow bore 61 through passages 62 and 63 in the bushing 64. From bore 61 the coolant is directed through passage 65 and nozzle 66 against the inside of sheath $S_1$.

Since the materials enumerated above should be heat and/or pressure sealed to provide satisfactory characteristics, it is important to introduce suitable means into the bore of the tube-forming mechanism which will not only provide the proper pressure seal, but also form the tubing into the proper configuration described above.

Referring now to Figure 7, it will be seen that the completed tubing is formed in such a way that the turns of helix H are completely surrounded or imbedded in or between the sheath. What is of considerable importance, however, is the fact that not only sheath $S_2$, the outer sheath, but also sheath $S_1$, the inner sheath, are radially positioned substantially beyond the centers of the individual convolutions $H_c$ of helix H. Furthermore, the sheath between the convolutions is outwardly convex so that when the tubing is bent or otherwise compressed the sheath cannot under any circumstances buckle or fold radially inward, thus creating a restriction in the bore of the tubing and effectively decreasing the diameter or causing an obstruction in the bore on which material passing through the tubing would lodge.

Figure 5 illustrates the shape of the tubing when bent at a relatively sharp angle and illustrates how the sheath is stretched at 67, 67 around the outer radius of the bend and also how the folds 68, 68 of the sheath are always formed outside of the helix diameter. The convex shape of the sheath in the normally unstressed condition enables the sheath material to be bent around much sharper radii because undue tension or stresses are avoided. However, the tubing returns to the normal condition shown in Figure 6 when straightened out.

Figure 3:
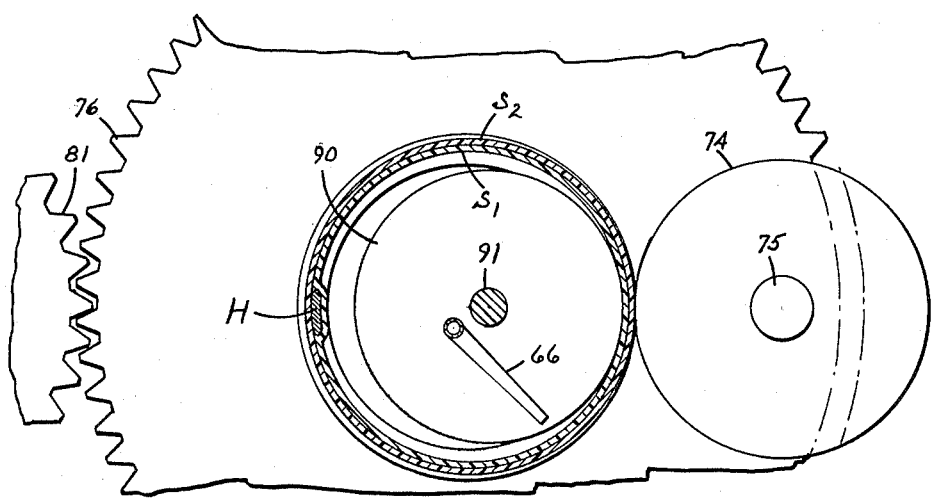
Figure 3 is an enlarged transverse sectional detail as seen at III—III of Figure 1.
Figure 4:
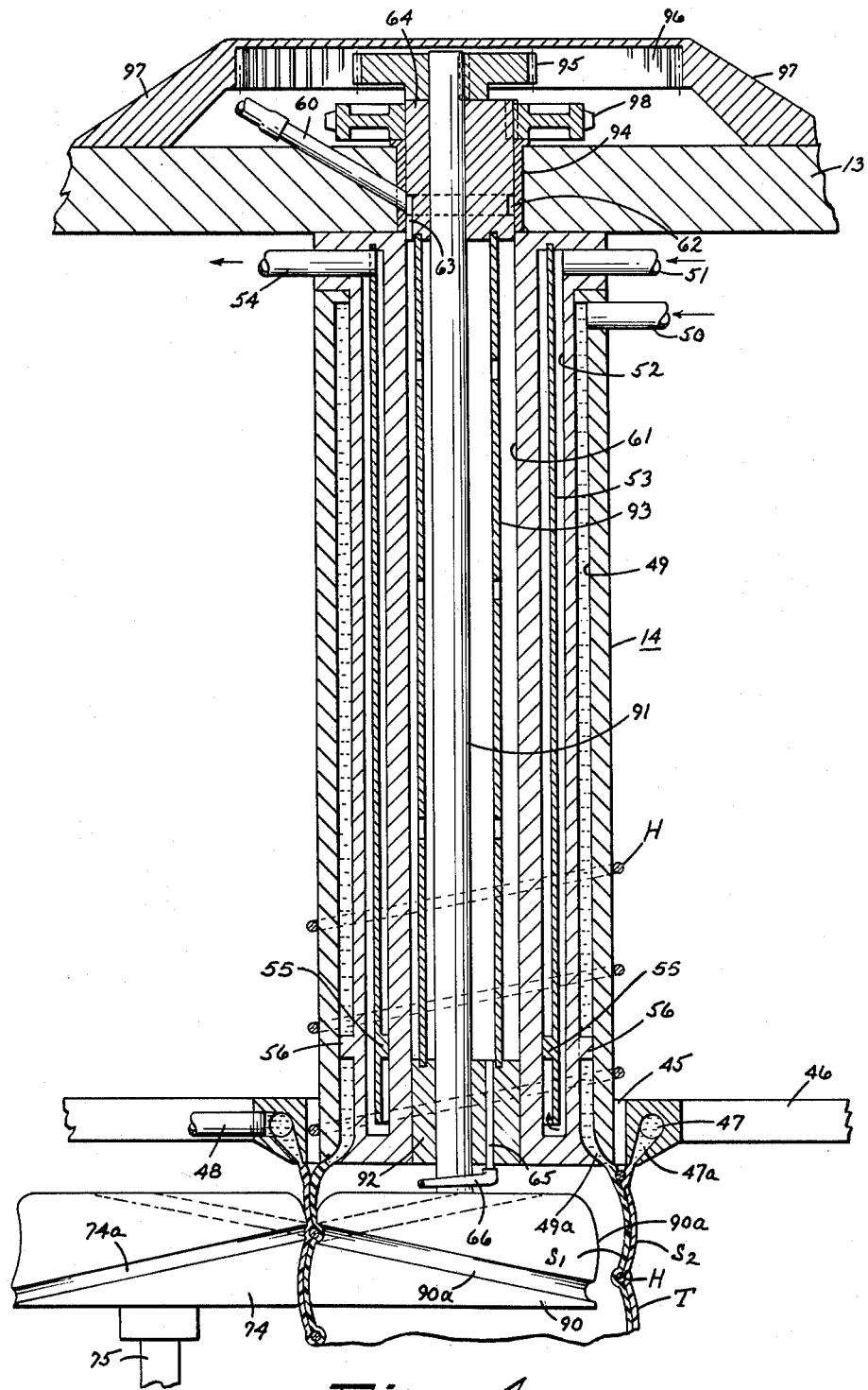
Figure 4 is an enlarged longitudinal sectional detail of the extruding head taken generally at IV—IV of Figure 1 with parts removed.

The pressure sealing mechanism shown in Figures 3 and 4 comprises a pair of specially shaped rolls 74 and 75, neither of which is free to rotate on its own axis, but they together revolve about the axis of mandrel 14 and concurrently press the sheaths S₁ and S₂ between the nip of the rolls. Also, these rolls are important in drawing the helix H as well as the sheaths from the mandrel and orifices. Roll 74 is shaped to provide the external configuration of the finished tubing as shown in Figure 7. Therefore, this roll has a relatively shallow groove 74a conforming to the pitch of helix H, and the periphery of the roll is arcuately concave to shape the convex portions of the sheath. Roll 74 is journaled on a stub shaft 75 mounted on ring gear 76 which is journaled in a hollow bracket 77 on frame cross member 80. Ring gear 76 and roller 74 are turned in timed relation with the other moving parts through a pinion gear 81 on stub shaft 82 and chain 83 connecting sprockets 84 and 85, the former being keyed to the main drive shaft 11. Roll 90 is mounted integrally on shaft 91 which turns freely in bushings 92 and 64 interconnected by a cage or sleeve 93. Bushing 64 is journaled in bearing sleeve 94 in frame cross member 13, and the outboard end of shaft 91 is provided with a pinion gear 95 which meshes with a fixed internal gear 96 mounted on cross frame 13 by brackets 97, 97. The diameter of roll 90 is somewhat less than the inside diameter of the completed tubing T and the shaft 91 is eccentrically mounted in bushings 64 and 92 so that the drive for shaft 91 is achieved through sprocket 98, keyed to shaft 91, chain 99, and main drive shaft 11 through sprocket 100. The periphery of roll 90 likewise conforms to the configuration of the bore of the tubing T. It, therefore, has a relatively deep groove 90a and a more arcuate periphery 90b which conforms to the desired configuration of the bore of the tube as shown in Figure 7. Nozzle 66 is directed to force air just in advance of the nip of rolls 74 and 90, so that both sheaths S₁ and S₂, but particularly S₁, are at the proper temperature for pressure sealing. The air or other fluid introduced into the bore of the tubing is free to pass around roll 90.

The proper timed relation of rolls 74 and 90 is maintained through the selection of the proper roll diameter and diameter for sprocket 98, pinion 95 and gear 96. This positive control of roll 90 is important, since when the machine is laced up, the individual convolutions Hc of helix H must be fed between both rolls 74 and 90 in accordance with the position of grooves 74a and 90a. These grooves register at the nip of the rolls and also assist in drawing helix H through passage 45 and thence off of mandrel 14.

It will thus be understood that I have provided an apparatus for satisfactorily rolling and pressure sealing a continuous helix of a reinforcing material, about which a synthetic plastic material is continuously extruded to imbed the helix in the plastic material. Furthermore, the drive and control for these rollers or mandrels permits any shape to be employed so that they are effective even though they are operated in timed relation to the continuous feeding of the helix. It will be apparent that in the case of a flat roller such a problem is not present. The apparatus is simple, efficient and can be used to produce flexible tubing which is indefinite in length.

Having thus described my invention, I claim:

1. An apparatus for continuously fabricating reinforced flexible tubing comprising a stationary cylindrical mandrel supported at one end, means adjacent said supported end for winding a reinforcing helical strand around said mandrel, an annular extrusion nozzle in the mandrel at the opposite end thereof, a second annular extrusion nozzle surrounding said other end of the mandrel, means positioned to contact the bore of a synthetic plastic sheath extruded from said nozzles, and means cooperating with said last-named means to pressure seal said synthetic plastic sheath around the helical strand.

2. An apparatus for continuously fabricating reinforced flexible tubing comprising a stationary cylindrical mandrel supported at one end, means adjacent said supported end for winding a reinforcing helical strand around said mandrel, an annular extrusion nozzle in the mandrel at the opposite end thereof, a second annular extrusion nozzle surrounding said other end of the mandrel, an internal pressure roll journaled in the mandrel and positioned to contact the bore of a synthetic plastic sheath extruded from one of said nozzles, an external pressure roll cooperating with said internal roll to pressure seal said synthetic plastic sheath around the helical strand, and means for driving said rolls in timed relation to the winding means.

3. An apparatus for continuously fabricating reinforced flexible tubing comprising a stationary cylindrical mandrel supported at one end, means adjacent said supported end for winding a reinforcing helical strand around said mandrel, an annular extrusion nozzle in the mandrel at the opposite end thereof, a second annular extrusion nozzle surrounding said other end of the mandrel, means for advancing the helical strand from the winding means to the nozzles, an internal pressure roll journaled in the mandrel and positioned to contact the bore of a synthetic plastic sheath extruded from one of said nozzles, an external pressure roll cooperating with said internal roll to pressure seal said synthetic plastic sheath around the helical strand, and means for driving said rolls in timed relation to the winding means.

4. An apparatus for continuously fabricating reinforced flexible tubing comprising a stationary cylindrical mandrel supported at one end, means adjacent said supported end for winding a reinforcing helical strand around said mandrel, an annular extrusion nozzle in the mandrel at the opposite end thereof a second annular extrusion nozzle surrounding said other end of the mandrel, means adjacent the winding means for preventing relative rotation of the strand with respect to the mandrel as the strand advances axially from the winding means towards the nozzles, an internal pressure roll journaled in the mandrel and positioned to contact the bore of a synthetic plastic sheath extruded from one of said nozzles, an external pressure roll cooperating with said internal roll to pressure seal said synthetic plastic sheath around the helical strand, and means for driving said rolls in timed relation to the winding means.

5. An apparatus for continuously fabricating reinforced flexible tubing comprising a stationary cylindrical mandrel supported at one end, means adjacent said supported end for winding a reinforcing helical strand around said mandrel, an annular extrusion nozzle in the mandrel at the opposite end thereof, a second annular extrusion nozzle surrounding said other end of the mandrel, means for advancing the strand from the winding means towards the nozzles, means adjacent the winding means for preventing relative rotation of the strand with respect to the mandrel as the strand advances axially from the winding means towards the nozzles, an internal pressure roll journaled in the mandrel and positioned to contact the bore of a synthetic plastic sheath extruded from one of said nozzles, an external pressure roll cooperating with said internal roll to pressure seal said synthetic plastic sheath around the helical strand, and means for driving said rolls in timed relation to the winding means.

6. An apparatus for continuously fabricating flexible reinforced tubing comprising a frame, a drive shaft journaled on said frame, a stationary mandrel supported at one end on said frame, a wire winder mounted in the frame adjacent the supported end of said mandrel, driving means connecting the wire winder and the drive shaft, a plate journaled in the frame around the mandrel adjacent the wire winder, driving means connecting said plate to the drive shaft to turn the plate in timed relation with the wire winder, means mounted on the plate for engaging the turns of wire formed by the winder and feeding them axially along the mandrel without backwinding, a shaft extending through the mandrel, an internal pressure roll connected to said shaft beyond the outboard end of the mandrel, an eccentric mounting for the shaft in the mandrel, driving means connecting the eccentric mounting and the drive shaft, means for rotating the shaft in the eccentric mounting, an external pressure roll cooperating with the internal roll to provide a pressure sealing nip therebetween, means on which said external pressure roll is mounted for revolving said roll around the axis of the mandrel, driving means connecting the drive shaft and said last-named means, means for introducing a sheath of synthetic plastic material around the helix as it leaves the mandrel, and means extending through the mandrel for introducing a second synthetic plastic sheath into the bore of the helix in advance of the pressure rolls.

7. An apparatus for continuously fabricating flexible reinforced tubing comprising a frame, a drive shaft journaled on said frame, a stationary mandrel supported at one end on said frame, a wire winder mounted in the frame adjacent the supported end of said mandrel, driving means connecting the wire winder and the drive shaft, a plate journaled in the frame around the mandrel adjacent the wire winder, driving means connecting said plate to the drive shaft to turn the plate in timed relation with the wire winder, a plurality of rollers mounted on the plate for engaging the turns of wire formed by the winder and feeding them axially along the mandrel without back-winding, a shaft extending through the mandrel, an internal pressure roll connected to said shaft beyond the outboard end of the mandrel, an eccentric mounting for the shaft in the mandrel, driving means connecting the eccentric mounting and the drive shaft, means for rotating the shaft in the eccentric mounting, an external pressure roll cooperating with the internal roll to provide a pressure sealing nip therebetween, means on which said external pressure roll is mounted for revolving said roll around the axis of the mandrel, driving means connecting the drive shaft and said last-named means, means for introducing a sheath of synthetic plastic material around the helix as it leaves the mandrel, and means extending through the mandrel for introducing a second synthetic plastic sheath into the bore of the helix in advance of the pressure rolls.

8. Apparatus in accordance with claim 7 having means extending through the mandrel for directing coolant to an area adjacent the nip of the internal and external pressure rolls.

9. Apparatus in accordance with claim 7 having means in the mandrel for heating the synthetic plastic material before extrusion from the nozzle in the mandrel.

10. Apparatus in accordance with claim 7 having means extending through the mandrel for directing coolant to an area adjacent the nip of the internal and external pressure rolls and means in the mandrel for heating the synthetic plastic material before extrusion from the nozzle in the mandrel.

11. Apparatus in accordance with claim 7 having means for swinging the rollers mounted on the plate to an inoperative position.

12. Apparatus in accordance with claim 11 in which the rollers on the plate are provided with helical grooves to engage the strand and means on the plate and the rollers for setting the rollers so that the grooves in the rollers are positioned to engage the strand.

13. In apparatus for continuously fabricating flexible reinforced tubing, a stationary mandrel, means contiguous to one terminus of the mandrel for continuously forming said flexible tubing in alignment with the center of the mandrel, means for winding and moving a helical reinforcing strand around and along the mandrel towards the tubing, a shaft eccentrically journaled in said mandrel, and an internal pressure roll mounted on said shaft beyond the terminus of the mandrel for shaping and guiding the strand and the tubing.

14. In apparatus for continuously fabricating flexible reinforced tubing, a stationary mandrel, means contiguous to one terminus of the mandrel for continuously forming said flexible tubing in alignment with the center of the mandrel, means for winding and moving a helical reinforcing strand around and along the mandrel towards the tubing, a support for one terminus of said mandrel, a shaft eccentrically journaled in said mandrel, and an internal pressure roll mounted on said shaft beyond the terminus of the mandrel for shaping and guiding the strand and the tubing.

15. In apparatus for continuously fabricating flexible reinforced tubing, the subcombination that comprises a stationary mandrel about which a helical reinforcing strand is wound and moved axially therealong, a shaft eccentrically journaled in said mandrel, an internal pressure roll mounted on said shaft beyond one terminus of the mandrel, a cage for said shaft concentrically rotatable in the mandrel, means for turning said cage with respect to the mandrel, and means connected to the shaft opposite the roll for turning the shaft in said cage.

16. In apparatus for continuously fabricating flexible reinforced tubing, the subcombination that comprises a stationary mandrel about which a helical reinforcing strand is wound and moved axially therealong, a shaft eccentrically journaled in said mandrel, an internal pressure roll mounted on said shaft beyond one terminus of the mandrel, a cage for said shaft concentrically rotatable in the mandrel, means for turning said cage with respect to the mandrel, means connected to the shaft opposite the roll for turning the shaft in said cage, walls defining an annular extrusion nozzle adjacent said terminus of the mandrel, means for supplying synthetic plastic material to said nozzle through the bore of the mandrel, walls defining a heating chamber adjacent said last named means, and walls defining a fluid coolant passage extending through the bore of the mandrel.

17. In apparatus for continuously fabricating flexible reinforced tubing, the subcombination that comprises a stationary mandrel about which a helical reinforcing strand is wound and moved axially therealong, a shaft eccentrically journaled in said mandrel, an internal pressure roll mounted on said shaft beyond one terminus of the mandrel, a cage for said shaft concentrically rotatable in the mandrel, means for turning said cage with respect to the mandrel, means connected to the shaft opposite the roll for turning the shaft in said cage, walls defining an annular extrusion nozzle adjacent said terminus of the mandrel, means for supplying synthetic plastic material to said nozzle through the bore of the mandrel, walls defining an annular heating chamber adjacent said last-named means, and walls defining an annular fluid coolant passage extending through the bore of the mandrel.

18. In apparatus for continuously fabricating flexible reinforced tubing, the subcombination that comprises a stationary mandrel about which a helical reinforcing strand is wound and moved axially therealong, a support for one end of said mandrel, a shaft eccentrically journaled in said mandrel, an internal pressure roll mounted on said shaft beyond the unsupported terminus of the mandrel, a cage for said shaft concentrically rotatable in the mandrel, means for turning said cage with respect to the mandrel, means connected to the shaft opposite the roll for turning the shaft in said cage, walls defining an annular extrusion nozzle adjacent said unsupported terminus of the mandrel, means for supplying synthetic plastic material to said nozzle through the bore of the mandrel, walls defining an annular heating chamber adjacent said last-named means, and walls defining an annular fluid coolant passage extending through the bore of the mandrel.

19. Apparatus as defined in claim 18 in which the synthetic plastic passage has the largest diameter, the coolant passage has the smallest diameter, and the heating passage has an intermediate diameter.

References Cited in the file of this patent

UNITED STATES PATENTS

| | | |
|---|---|---|
| 2,002,896 | Kopetz | May 28, 1935 |
| 2,366,087 | Chernack | Dec. 26, 1944 |